(12) United States Patent
Schur et al.

(10) Patent No.: US 12,141,350 B2
(45) Date of Patent: Nov. 12, 2024

(54) VERGENCE BASED GAZE MATCHING FOR MIXED-MODE IMMERSIVE TELEPRESENCE APPLICATION

(71) Applicant: Tencent America LLC, Palo Alto, CA (US)

(72) Inventors: Ethan Schur, San Jose, CA (US); Xiaozhong Xu, State College, PA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 18/207,594

(22) Filed: Jun. 8, 2023

(65) Prior Publication Data
US 2024/0012472 A1 Jan. 11, 2024

Related U.S. Application Data

(60) Provisional application No. 63/359,746, filed on Jul. 8, 2022.

(51) Int. Cl.
*G06F 3/01* (2006.01)
*G06T 7/70* (2017.01)

(52) U.S. Cl.
CPC .............. *G06F 3/013* (2013.01); *G06F 3/012* (2013.01); *G06T 7/70* (2017.01); *G06T 2207/10012* (2013.01); *G06T 2207/30201* (2013.01)

(58) Field of Classification Search
CPC . G06F 3/013; G06F 3/012; G06T 7/70; G06T 2207/10012; G06T 2207/30201
See application file for complete search history.

(56) References Cited

U.S. PATENT DOCUMENTS

| | | | | |
|---|---|---|---|---|
| 5,500,671 A | * | 3/1996 | Andersson | H04N 7/144 348/E7.083 |
| 6,677,980 B1 | * | 1/2004 | Jeon | H04N 7/144 382/100 |
| 9,952,665 B2 | * | 4/2018 | Di Censo | G06F 3/013 |
| 10,379,612 B1 | * | 8/2019 | Bonnier | G06F 3/0304 |
| 10,667,073 B1 | * | 5/2020 | Blewett | H04R 5/033 |
| 11,170,521 B1 | * | 11/2021 | Ben Himane | G06T 19/20 |
| 11,262,580 B1 | * | 3/2022 | Topliss | G02B 26/101 |
| 11,269,406 B1 | * | 3/2022 | Sztuk | G06F 3/011 |
| 2003/0197779 A1 | * | 10/2003 | Zhang | H04N 7/144 348/14.09 |
| 2006/0158730 A1 | * | 7/2006 | Kira | H04N 13/133 359/462 |

(Continued)

OTHER PUBLICATIONS

International Search Report issued in Application No. PCT/US2023/068536, mailed Oct. 3, 2023, 9 pages.

*Primary Examiner* — Amy Onyekaba
(74) *Attorney, Agent, or Firm* — ArentFox Schiff LLP

(57) ABSTRACT

Aspects of the disclosure provide methods and apparatuses for gaze matching. In some examples, processing circuitry determines a position of an object of interest for a first user, and receives first one or more images of the first user that is taken by a camera at a camera position different from the position of the object of interest. The processing circuitry detects a first vergence of eyes of the first user, calculates a mismatch of the first vergence for viewing the object of interest, and performs a gaze correction of the first one or more images based on the mismatch of the first vergence for viewing the object of interest.

20 Claims, 4 Drawing Sheets

(56) References Cited

U.S. PATENT DOCUMENTS

| | | | | |
|---|---|---|---|---|
| 2010/0295920 | A1* | 11/2010 | McGowan | H04N 7/15 348/E7.083 |
| 2013/0222644 | A1* | 8/2013 | Son | G06F 3/013 348/239 |
| 2013/0241805 | A1* | 9/2013 | Gomez | G06F 3/013 345/8 |
| 2015/0063665 | A1* | 3/2015 | Sasakido | G06V 40/174 382/128 |
| 2017/0195662 | A1* | 7/2017 | Sommerlade | G06F 3/013 |
| 2017/0257671 | A1* | 9/2017 | Yerli | H04N 21/4668 |
| 2017/0364149 | A1* | 12/2017 | Lu | G06F 3/013 |
| 2019/0025912 | A1* | 1/2019 | Kimura | G06F 3/013 |
| 2020/0209624 | A1* | 7/2020 | Sztuk | G06T 19/00 |
| 2020/0211512 | A1* | 7/2020 | Sztuk | G09G 5/38 |
| 2020/0241575 | A1* | 7/2020 | Meisenholder | G05D 1/12 |
| 2020/0305712 | A1* | 10/2020 | Kojima | A61B 3/113 |
| 2021/0014477 | A1* | 1/2021 | Jia | G06T 7/60 |
| 2021/0169322 | A1* | 6/2021 | Krall | A61B 3/08 |
| 2022/0011859 | A1* | 1/2022 | Uscinski | G06T 15/06 |
| 2022/0091427 | A1* | 3/2022 | Edwin | A63F 13/23 |
| 2022/0280035 | A1* | 9/2022 | Zakharov | G02C 13/005 |
| 2023/0037329 | A1* | 2/2023 | Erkelens | G06F 3/011 |
| 2023/0266820 | A1* | 8/2023 | Uchida | G01C 3/085 345/156 |
| 2023/0414100 | A1* | 12/2023 | Krall | A61B 3/0091 |

* cited by examiner

VERGENCE BASED GAZE MATCHING FOR MIXED-MODE IMMERSIVE TELEPRESENCE APPLICATION

INCORPORATION BY REFERENCE

This present disclosure claims the benefit of priority to U.S. Provisional Application No. 63/359,746, "Vergence based gaze matching for mixed-mode immersive telepresence application" filed on Jul. 8, 2022, which is incorporated by reference herein in its entirety.

TECHNICAL FIELD

The present disclosure describes embodiments generally related to media processing, including real-time immersive telepresence applications.

BACKGROUND

The background description provided herein is for the purpose of generally presenting the context of the disclosure. Work of the presently named inventors, to the extent the work is described in this background section, as well as aspects of the description that may otherwise qualify as prior art at the time of filing, are neither expressly nor impliedly admitted as prior art against the present disclosure.

Real-time immersive telepresence applications, such as video chat, training, and education can allow people at remote locations to enact real-time conversation, training, and various pedagogical teaching models. In some examples, during a real time immersive telepresence application, a display screen is placed in front of a first user and the display screen can display images of a second user to simulate a face-to-face environment.

SUMMARY

Aspects of the disclosure provide methods and apparatuses for gaze matching. In some examples, processing circuitry determines a position of an object of interest for a first user, and receives first one or more images of the first user that is taken by a camera at a camera position different from the position of the object of interest. The processing circuitry detects a first vergence or rotation of eyes of the first user, calculates a mismatch of the first vergence or rotation for viewing the object of interest, and performs a gaze correction of the first one or more images based on the mismatch of the first vergence or rotation for viewing the object of interest.

In some examples, the processing circuitry receives second one or more images of a second user, the second user and the first user conduct an immersive telepresence. The processing circuitry derives an interpupillary position of the second user from the second one or more images, displays the second one or more images with the interpupillary position being set at a screen plane of a display screen for the first user, and determines the interpupillary position at the screen plane of the display screen as the position of the object of interest for the first user.

In some examples, the processing circuitry determines a center point of a display screen for the first user as the position of object of interest for the first user.

In some examples, the processing circuitry receives second one or more images of a second user, the second user and the first user conducting an immersive telepresence, displays the second one or more images on a display screen for the first user, and determines a position on the display screen for displaying an eye of the second user as the position of the object of interest for the first user.

In an example, the first vergence or rotation is sensed based on an eye-tracking sensor that is separate from the camera. In another example, the first vergence or rotation is detected based on an image analysis of the first one or more images of the first user.

In some examples, the processing circuitry calculates the first vergence or rotation of the eyes of the first user based on a head position of the first user.

In some examples, the processing circuitry determines a gazing point according to the first vergence or rotation of the eyes of the first user and a head position of the first user, and calculates the mismatch of the gazing point to the position of the object of interest for the first user.

In an example, the processing circuitry modifies a head position of the first user in the first one or more images. In another example, the processing circuitry modifies a body position of the first user in the first one or more images. In another example, the processing circuitry modifies a head pose of the first user in the first one or more images. In another example, the processing circuitry modifies a body pose of the first user in the first one or more images. In another example, the processing circuitry modifies a head rotation angle of the first user in the first one or more images. In another example, the processing circuitry modifies a body rotation angle of the first user in the first one or more images. In another example, the processing circuitry modifies an eye vergence or rotation angle of the first user in one or more images.

In some examples, the processing circuitry determines the position of the object of interest according to at least one of a facial expression of a person on a display screen, visual sentimental analysis of the person on the display screen, or a mood of the person on the display screen.

In some examples, the processing circuitry detects the first vergence or rotation of the eyes of the first user by using at least one of an inertial measurement unit (IMU), a depth sensor, a light detection and ranging (LiDar) sensor, a near infrared (NIR) sensor, or a spatial audio detector.

Aspects of the disclosure also provide a non-transitory computer-readable medium storing instructions which when executed by a computer cause the computer to perform the method of gaze matching.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

In various scenarios, a camera may not be able to be allocated right in front of a person. Thus, a picture of the person taken by the camera may show an eye gaze that is different from the real eye gaze of the person in reality.

According to an aspect of the disclosure, in immersive telepresence applications, eye gaze connection between a person in reality and imagery of a person can improve the feeling of immersion and increase cognition and can be a ubiquitous cue in some examples.

Some aspects of the disclosure provide techniques for vergence or rotational based imagery gaze adjustment, such as gaze correction, gaze matching, and the like. The imagery gaze adjustment can compensate for camera position, and can match gazes of users in the immersive telepresence applications.

According to some aspects of the disclosure, the vergence based imagery gaze adjustment can detect a vergence or rotation of eyes of a user, and determine whether the vergence, the positions of the eyes and the head of the user match viewing an object of interest for the user. For example, gaze can refer to a fixed visual attention by a user, a gazing position (also referred to as gaze position) of the user in an image can be determined based on the vergence or rotation of the eyes of the user, the positions of the eyes and the head pose of the user in the image. Further, gaze correction parameters can be determined to match the gazing position with the position of the object of interest. For example, rotation parameters of the head and the eyes can be determined to adjust the gazing position to match with the position of the object of interest. In some examples, one or more images of the user are taken, and the positions of the head and the eyes in the one or more images can be adjusted according to the gaze correction parameters. Thus, the user in the one or more images can have appropriate gaze, for example, to the object of interest.

Figure 1:
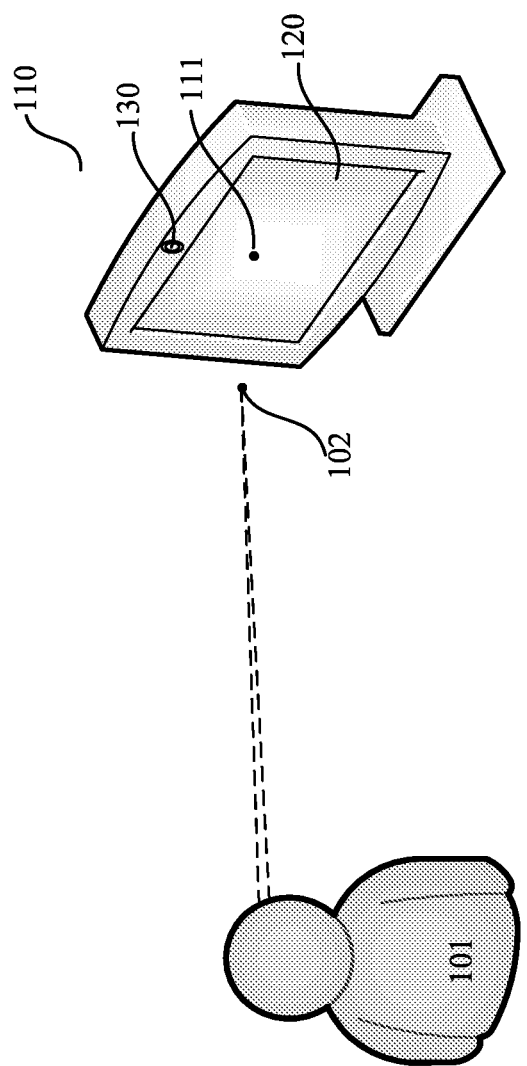
FIG. 1 shows a diagram of gaze correction according to some embodiments of the disclosure.

FIG. 1 shows a diagram of gaze correction according to some embodiments of the disclosure. In the FIG. 1 example, a user (101) (e.g., a person) is in front of a display screen (120). The display screen (120) can be a portion of an electronic system (110), such as a computer system, an entertaining system, a gaming system, a communication system, an immersive telepresence system, and the like. Components of the electronic system (110) can be integrated in a package, or can be separate components that are connected by wired connections or wireless connections.

The electronic system (110) includes the display screen (120) and other suitable components, such as a camera (130), one or more processors (not shown, also referred to as processing circuitry), communication components (not shown), and the like. In the FIG. 1 example, the camera (130) is located on top of the display screen (120). It is noted that the camera (130) can be placed at other suitable location, such as side of the display screen (120) and the like.

Generally, the user (101) is in front of the display screen (120) and is facing the display screen (120), and the display screen (120) is at about a face height of the user (101) for the user (101) to view content displayed on the display screen (120) comfortably. The camera (130) is generally placed on a periphery of the display screen (120) and is not placed right in front of the user (101) to avoid blocking the user (101) from viewing the content displayed on the display screen (120).

According to an aspect of the disclosure, images of the user (101) taken by the camera (130) when the user (101) looks at the display screen (120) may show the user (101) gazing in a different direction from about the center of the display screen (120). For example, when the user (101) is looking at a center position of the display screen (120), the images of the user (101) taken by the camera (130) may show that the user (101) is looking at a position lower than the center position of the display screen (120).

In another example, the user (101) is a first user that is communicating with a second user via a telepresence application. The user (101) may look at a note posted on the left side of the display screen (120) when the camera (130) captures an image of the user (101). When the image is transmitted and presented on a second display screen in front of the second user, the image of the user (101) on the second display screen appears not looking into the direction of the second user, thus the second user feels no eye contact with the first user.

In the FIG. 1 example, a vergence or rotational based gaze correction can be performed, for example by the electronic system (110), to compensate for the camera position and/or to match the gaze of the second user for eye contact. For example, the electronic system (110) can detect a vergence of eyes of the user (101). The vergence of the eyes is movement of both eyes in opposite directions (also referred to as inward rotational movement) to obtain or maintain single binocular vision. The vergence of the eyes is then used to perform gaze adjustment. It is noted that other suitable rotational eyeball movement, such as vertical rotational eyeball movement, horizontal eyeball movement or any combination of rotational eyeball movement can be used for gaze correction. In some examples, the vergence of the eyes and other suitable information, such as a position of the head and/or positions of the eyes of the user (101), can determine a gazing position (102) of the user (101). The gazing position (102) is compared with a position (111) of an object of interest for the user (101) to determine gaze correction parameters. For example, the gaze correction parameters can be applied to the user (101) in order to adjust the corrected gazing position to the position (111). In some examples, the gaze correction parameters can be used for processing images of the user (101), so that the user (101) in the processed images appears to gaze at the object of interest.

It is noted that the vergence of the eyes can be detected by various techniques. In an example, a physical eye tracking sensor is used to detect the vergence of the eyes. In another example, image analysis can be performed on images of the user (101) to detect the vergency of the eyes. In another example, the user's head position alone is used to detect the vergence of the eyes of the user (101).

In some examples, the head position and the vergence of the eyes ae used to perform gaze adjustment. The gaze adjustment can compensate for the camera position and can match the gaze of the second user.

It is noted that the position of the object of interest can be determined by various techniques. In an example, a center point of the display screen (120) is determined to be the object of interest. In another example, an image of the second user is displayed on the display screen (120), and the eye position of the second user on the display screen (120) is determined to be the position of the object of interest. In another example, the position of the object of interest is determined according to at least one of a facial expression of a person on a display screen, visual sentimental analysis of the person on the display screen, or a mood of the person on the display screen.

In some examples, the images of the user (101) taken by the camera (130) are modified. For example, position, pose or rotation of the body of the user (101) in the images can be adjusted. In another example, position, pose or rotation of the head of the user (101) in the images can be adjusted. In another example, the position and rotation of eyes of the user (101) in the images can be adjusted.

It is noted that components in FIG. 1 are shown for illustration, various different components can be used to implements the electronic system (110). For example, the electronic system (110) is configured for an immersive telepresence. For example, the display screen (120) can be implemented using a 3D display, such as an 8K autostereoscopic display with left and right view cones. The camera (130) can be implemented using high speed RGB cameras, stereo cameras, multicamera, depth capture camera, and the like. In an example, the camera (130) is implemented using 4K stereoscopic RGB cameras. The electronic system (110) can include a high speed transceiver, such as an transceiver that is capable for live 8K 3D transmission. In some examples, the electronic system (110) can include an eye tracking sensor separate from the camera (130).

According to some aspects of the disclosure, the vergence based gaze adjustment can be performed in immersive telepresence applications for vergence based gaze matching to improve immersive experience.

Figure 2:
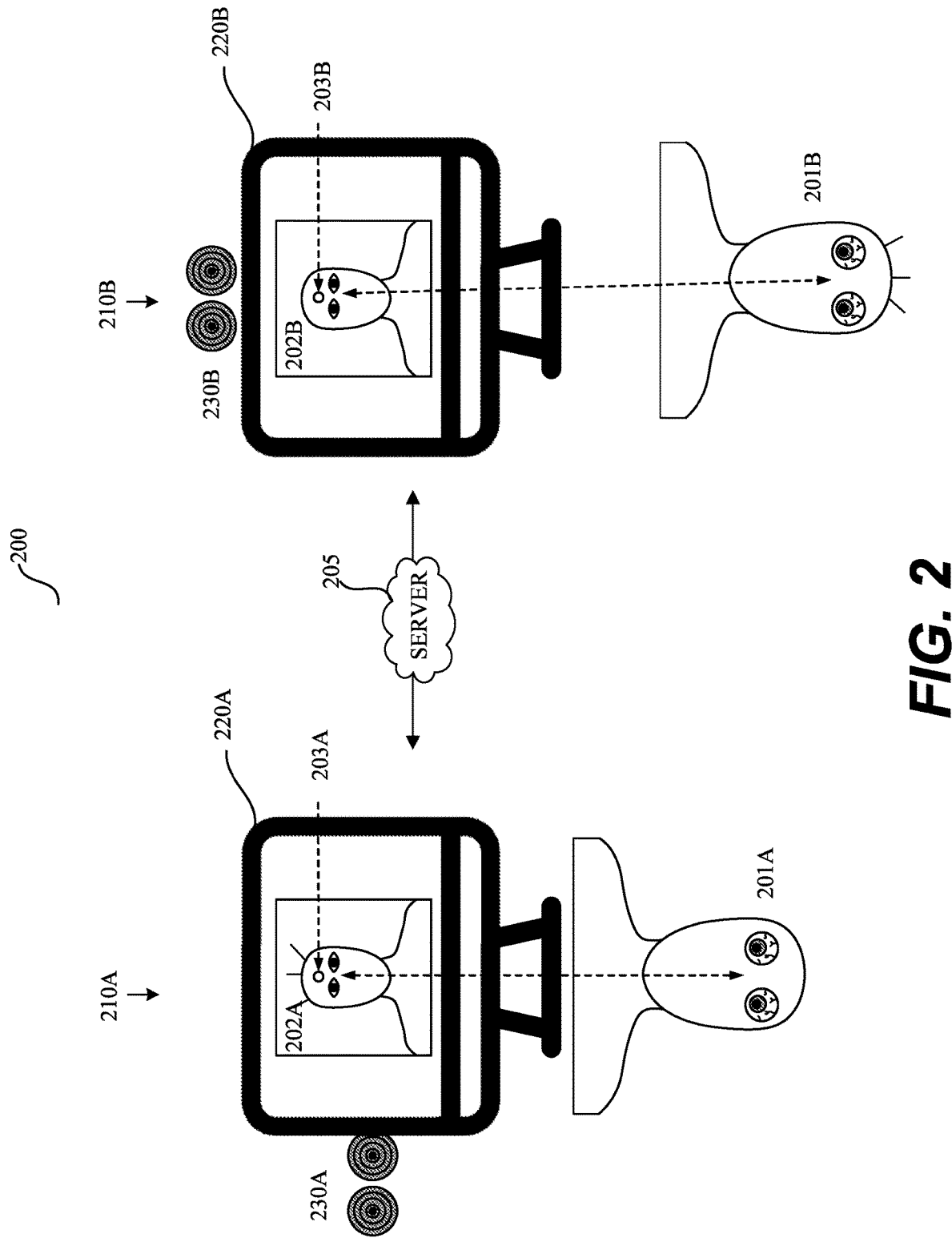
FIG. 2 shows a diagram of an immersive telepresence system in some embodiments.

FIG. 2 shows a diagram of an immersive telepresence system (200) in some embodiments. The immersive telepresence system (200) includes a first electronic system (210A) and a second electronic system (210B) that is connected by a network (205). The immersive telepresence system (200) can perform two-way real time gaze matching in some examples. In some examples, the immersive telepresence application is hosted by a server device, and the first electronic system (210A) and the second electronic system (210B) can be client devices for the immersive telepresence application.

According to some aspects of the disclosure, the virtual background of the immersive telepresence application can be rendered on clients, such as the first electronic system (210A) and the second electronic system (210B), by virtual cameras, the dynamic human subject in the foreground can be captured with a stereoscopic camera array. In some examples, the vergence refers to inward/outward rotation of eyes to fixate on objects, and accommodation refers to the eye's focusing mechanism to produce a sharp image on a retina. To avoid vergence and accommodation mismatch by a user, horizontal image translation technique can be used to set the depth position of the object of interest (e.g., eyes of the person on the display screen) for the user at the screen plane of the display screen, and the screen plane is also referred to as the zero parallax position, so that the user's focus, accommodation, and vergence can be matching in some examples. With the user a distance from the cameras, the inward vergence rotation of the two eyes of the user can be calculated and gaze correction can be applied when the user is actually looking into the eyes of the person on display screen.

The first electronic system (210A) and the second electronic system (210B) can be respectively configured similarly to the electronic system (110).

For example, the first electronic system (210A) includes a display screen (220A) that is implemented using a 3D display, such as an 8K autostereoscopic display with left and right view cones, or any number of view cones. The first electronic system (210A) includes a camera (230A) that is implemented using high speed RGB cameras, stereo cameras, multicamera, depth capture cameras, and the like. The first electronic system (210A) includes a transceiver (not shown, wired or wireless) configured to transmit signals to the network (205) and/or receive signals from the network (205). In some examples, the first electronic system (210A) can include an eye tracking sensor (not shown) separate from the camera (230A). The first electronic system (210A) also includes processing circuitry, such as one or more processors (not shown) for image processing.

Similarly, the second electronic system (210B) includes a display screen (220B) that is implemented using a 3D display, such as an 8K autostereoscopic display with left and right view cones, or any number of view cones. The second electronic system (210B) includes a camera (230B) that is implemented using high speed RGB cameras, stereo cameras, multicamera, depth capture cameras, and the like. The second electronic system (210B) includes a transceiver (not shown, wired or wireless) configured to transmit signals to the network (205) and/or receive signals from the network (205). In some examples, the second electronic system (210B) can include an eye tracking sensor separate from the camera (230B). The second electronic system (210B) also includes processing circuitry, such as one or more processors (not shown) for image processing.

The immersive telepresence system (200) can perform two-way real time gaze matching. In the FIG. 2 example, a first user (201A) is in front of the display screen (220A) and is facing the display screen (220A), and the display screen (220A) is at about a face height of the first user (201A) for the first user (201A) to view content displayed on the display screen (220A) comfortably. The camera (230A) is placed on a periphery of the display screen (220A) and is not placed right in front of the first user (201A) to avoid blocking the first user (201A) from viewing the content displayed on the display screen (220A). For example, the camera (230A) is placed on a left side of the display screen (220A) in FIG. 2.

Similarly, a second user (201B) is in front of the display screen (220B) and is facing the display screen (220B), and the display screen (220B) is at about a face height of the second user (201B) for the second user (201B) to view content displayed on the display screen (220B) comfortably. The camera (230B) is placed on a periphery of the display screen (220B) and is not placed in front of the second user (201B) to avoid blocking the second user (201B) from viewing the content displayed on the display screen (220B). For example, the camera (230B) is placed on a top of the display screen (220B) in FIG. 2.

According to some aspects of the disclosure, the camera (230A) takes first stereo images of the first user (201A). The first stereo images can be processed, for example according to the vergence based gaze matching. In an example, the first stereo images are processed by the processing circuitry of the first electronic system (210A) according to the vergence based gaze matching. In another example, the first stereo images are processed by a server (e.g., an immersive telepresence server) in the network (205) according to the vergence based gaze matching. The processed first stereo images are sent to the second electronic system (210B). The processed first stereo images are displayed by the display screen (220B) to show modified images, such as a displayed image (202B) of the first user (201A) in FIG. 2. In some examples, the first stereo images or the processed first stereo images can be further processed by the processing circuitry of the second electronic system (210B) for gaze matching, and then the processed first stereo images are displayed by the display screen (220B) to shown modified images, such as the displayed image (202B) of the first user (201A).

Similarly, the camera (230B) takes second stereo images of the second user (201B). The second stereo images can be processed, for example according to the vergence based gaze matching. In an example, the second stereo images are processed by the processing circuitry of the second electronic system (210B) according to the vergence based gaze matching. In another example, the second stereo images are processed by the server (e.g., the immersive telepresence server) in the network (205) according to the vergence based gaze matching. The processes second stereo images are sent to the first electronic system (210A). The processed second stereo images are displayed by the display screen (220A) to show modified images, such as a displayed image (202A) of the second user (201B) in FIG. 2. In some examples, the second stereo images or the processed second stereo images can be further processed by the processing circuitry of the first electronic system (210A) and then the further processed second stereo images are displayed by the display screen (220A) to show modified images, such as the displayed image (202A) of the second user (201B).

In some examples, when the first user (201A) looks at the displayed image (202A), the first user (201A) has eye contact (also referred to as gaze matching) with the displayed image (202A) of the second user (201B). The eye contact improves the immersive experience of the first user (201A).

Similarly, when the second user (201B) looks at the displayed image (202B), the second user (201B) has eye contact (also referred to as gaze matching) with the displayed image (202B) of the first user (201A). The eye contact improves the immersive experience of the second user (201B). It is noted that the first user (201A) and the second user (201B) do not need to look at the displayed images at the same time to have the eye contacts in some examples.

In some examples, the first electronic system (210A) receives the processed second stereo images of the second user (201B). In some examples, a processed second stereo image includes a pair of images. For each image of the pair of images, an interpupillary position (e.g., a middle position of two pupils) of a person (e.g., the second user (201B)) in the image is determined. For example, two pupils in the image are determined and a 3D XYZ coordinate of the interpupillary position of the two pupils is determined. The interpupillary positions of the pair of images are used to respectively shift the pair of images for display on the display screen (220A), such that the interpupillary positions are overlapped and displayed at one position on the display screen (220A), and thus the depth plane of the eyes is set to the screen plane of the display screen (220A). Then, the eyes of the person that is displayed according to the shifted images can be observed at the screen plane of the display screen (220A), and the screen plane of the display screen (220A) can be referred to as a zero parallax position (ZPS). In some examples, when the eyes are observed at the screen plane, the nose can be observed in front of the screen plane and back of the head is behind the screen plane. In an example, the position of the overlapped interpupillary positions on the display screen (220A), such as shown by (203A), is defined as object of interest for the first user (201A) in order to achieve gaze matching.

Further, in the FIG. 2 example, the vergence of the eyes of the first user (201A) is detected. In an example, an eye tracking sensor can determine the movement of the eyes of the first user (201A). The movement of the eyes can be used to determine a 3D vector of a converged point by the vergence of the eyes. In another example, the 3D vector of the converged point by the vergence of the eyes is determined according to image analysis of the first stereo images of the first user (201A). In some examples, a head rotation (or head position, or head pose) can be determined from the image analysis of the first stereo images of the first user (201A).

The vergence of the eyes is then used to perform gaze adjustment. In some examples, the vergence of the eyes and other suitable information, such as the head rotation, positions of the eyes of the first user (201A), can determine a gazing position of the first user (201A). The gazing position of the first user (201A) is compared with the position of the object of interest of the first user (201A) to determine gaze correction parameters for the first stereo images. The first stereo images can be processed according to the gaze correction parameters.

In some examples, the first electronic system (210A) includes a sensing module configured to detect the vergence of the eyes of the first user (201A). In an example, the sensing module can be implemented by the camera (230A), such as a high speed RGB camera, a stereo camera, a multicamera, a depth capture camera and the like. In another example, the sensing module can be implemented by an eye tracking sensor.

In some examples, the first electronic system (210A) includes a rendering module that is configured to set the depth plane of the eyes of the person in the processed second stereo images relative to the screen plane of the display screen (220A). For example, the depth plane of the eyes of the person in the processed second stereo images is set to the screen plane of the display screen (220A). In some examples, the rendering module can be implemented by one or more processors that execute software instructions.

In some examples, the first electronic system (210A) includes a registration module that is configured to determine a mismatch between a gazing point and an object of interest. The gazing point can be determined based on vergence of eyes that are detected by eye tracking and other suitable information. In some examples, the registration module can include a compact model, and can be implemented by one or more processors that execute software instructions.

In some examples, the first electronic system (210A) includes a gaze correction module that is configured to perform gaze correction in the first stereo images. In some examples, the gaze correction module can receive live input from the sensing module and the registration module, and can perform modifications to the first stereo images. For example, the gate correction module can perform 2D inpainting and/or 3D rotational gaze corrections using live input from the sensing module and the registration module. In an example, the person in the first stereo images is in the form of 3D meshes. The 3D meshes can be rotated for gaze corrections. In an example, the eyes of the person can be rotated for the gaze corrections. In another example, the head of the person can be rotated for the gaze corrections. In another example, the body of the person can be rotated for the gaze corrections. In some examples, the gaze correction module is implemented by a neural network model that is trained to serve the purpose.

In an example, due to the location of the camera (230A), when the first user (201A) looks at the displayed image (202A) for example in a center of the display screen (220A), the first stereo images captured by the camera (230A) show that the first user (201A) looks in the right portion of the display screen (220A). The first electronic system (210A) performs vergence based gaze matching to determine gaze correction. For example, the gazing point of the first user (201A) can be determined based on vergence of the eyes, and gazing point can be a point in the right portion of the display screen (220A). A difference of the gazing point and the position of the object of interest (e.g., the interpupillary position at the screen plane of display screen (220A)) can be determined. Based on the difference, a rotation angle to rotate the person in the first stereo image to the left can be determined to correct the first stereo images. Then, a mesh representing the person in the first stereo images can be rotated to the left according to the rotation angle for the gaze corrections.

While in the above description, the first stereo images are processed by the first electronic system (210A) for the gaze corrections, it is noted that the gaze corrections can be suitably performed by a server in the network (205) in some examples, or can be performed by the second electronic system (210B) in some examples.

Similarly, in some examples, the second electronic system (210B) receives the processed first stereo images of the first user (201A). In some examples, a processed first stereo image includes a pair of images. For each image of the pair of images, an interpupillary position (e.g., a middle position of two pupils) of a person (the first user (201A)) in the image is determined. For example, two pupils in the image are determined and a 3D XYZ coordinate of the interpupillary position of the two pupils is determined. The interpupillary positions of the pair of images are used to respectively shift (also referred to as horizontal image translation in some examples) the pair of images for display on the display screen (220B), such that the interpupillary positions are overlapped and displayed at one point, and the depth plane of the eyes is set to the screen plane of the display screen (220B). Then, the eyes of the person that is displayed according to the shifted images can be observed at the screen plane of the display screen (220B), and the screen plane of the display screen (220B) can be referred to as a zero parallax position (ZPS). In some examples, when the eyes are observed at the screen plane, the nose can be observed in front of the screen plane and back of the head is behind the screen plane. In an example, the point of the overlapped interpupillary positions on the display screen (220B), such as shown by (203B), is defined as object of interest for the second user (201B) in order to achieve gaze matching.

Further, in the FIG. 2 example, the vergence of the eyes of the second user (201B) is detected. In an example, an eye tracking sensor can determine the movement of the eyes of the second user (201B). The movement of the eyes can be used to determine a 3D vector of a converged point by the vergence of the eyes. In another example, the 3D vector of the converged point by the vergence of the eyes is determined according to image analysis of the second stereo images of the second user (201B). In some examples, a head rotation (or head position, or head pose) is determined from the image analysis of the second stereo images of the second user (201B).

The vergence of the eyes is then used to perform gaze adjustment. In some examples, the vergence of the eyes and other suitable information, such as the head rotation, positions of the eyes of the second user (201B), can determine a gazing position of the second user (201B). The gazing position of the second user (201B) is compared with the position of the object of interest of the second user (201B) to determine gaze correction parameters for the second stereo images. The second stereo images can be processed according to the gaze correction parameters.

In some examples, the second electronic system (210B) includes a sensing module configured to detect the vergence of the eyes of the second user (201B). In an example, the sensing module can be implemented by the camera (230B), such as a high speed RGB camera, a stereo camera, a multicamera, a depth capture camera and the like. In another example, the sensing module can be implemented by an eye tracking sensor.

In some examples, the second electronic system (210B) includes a rendering module that is configured to set the depth plane of the eyes of the person in the process first stereo images relative to the screen plane of the display screen (220B). For example, the depth plane of the eyes of the person in the processed first stereo images is set at the screen plane of the display screen (220B). In some examples, the rendering module can be implemented by one or more processors that execute software instructions.

In some examples, the second electronic system (210B) includes a registration module that is configured to determine a mismatch between a gazing point and an object of interest. The gazing point can be determined based on vergence of eyes that are detected by eye tracking and other suitable information. In some examples, the registration module can be implemented by one or more processors that execute software instructions.

In some examples, the second electronic system (210B) includes a gaze correction module that is configured to perform gaze correction in the second stereo images. In some examples, the gaze correction module can receive live input from the sensing module and the registration module, and perform modifications to the second stereo images. For example, the gate correction module can perform 2D inpainting and/or 3D rotational gaze corrections using live input from the sensing module and the registration module. In an example, the person in the second stereo images is in the form of 3D meshes. The 3D meshes can be rotated for gaze corrections. In an example, the eyes of the person can be rotated for the gaze corrections. In another example, the head of the person can be rotated for the gaze corrections. In another example, the body of the person can be rotated for the gaze corrections. In some examples, the gaze correction module is implemented by a neural network model that is trained to serve the purpose.

In an example, due to the location of the camera (230B), when the second user (201B) looks at the displayed image (202A) for example at a center of the display screen (220B), the second stereo images captured by the camera (230B) show that the second user (201B) looks in the bottom portion of the display screen (220B). The second electronic system (210B) performs vergence based gaze matching to determine gaze correction. For example, the gazing point of the second user (201B) can be determined based on vergence of the eyes, and gazing point can be a point in the bottom portion of the display screen (220B). A difference of the gazing point and the position of the object of interest (e.g., the interpupillary position at the screen plane of display screen (220B)) can be determined. Based on the difference, a rotation angle to rotate the head or the body of the person in the second stereo image upward can be determined to modify the second stereo images. Then, a mesh representing the person in the second stereo images can be rotated upwards according to the rotation angle for the gaze corrections.

While in the above description, the second stereo images are processed by the second electronic system (210B) for the gaze corrections, it is noted that the gaze corrections can be suitably performed by a server in the network (205) in some examples, and can be performed by the first electronic system (210A) in some examples.

Figure 3:
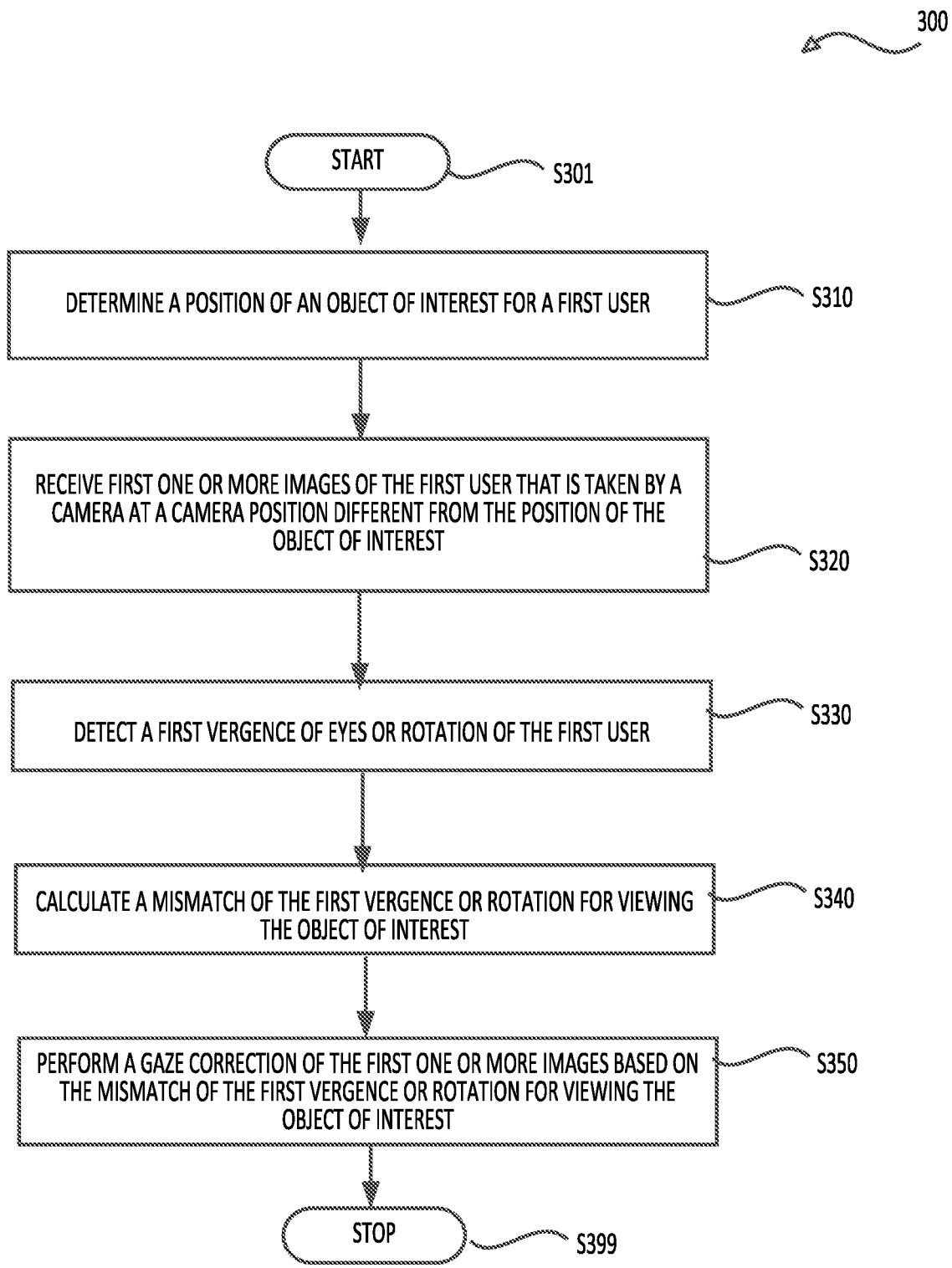
FIG. 3 shows a flow chart outlining a process according to some examples of the disclosure.

FIG. 3 shows a flow chart outlining a process (300) according to an embodiment of the disclosure. In various embodiments, the process (300) can be executed by processing circuitry in an electronic system, such as the electronic system (110), the first electronic system (210A), the second electronic system (210B), and the like. In some embodiments, the process (300) is implemented in software instructions, thus when the processing circuitry executes the software instructions, the processing circuitry performs the process (300). The process starts at (S301) and proceeds to (S310).

At (S310), a position of an object of interest for a user, such as a first user is determined.

At (S320), first one or more images of the first user that is taken by a camera at a camera position different from the position of the object of interest are received.

At (S330), a first vergence or rotation of eyes of the first user is determined.

At (S340), a mismatch of the first vergence or rotation for viewing the object of interest is determined.

At (S350), a gaze correction of the first one or more images is performed based on the mismatch of the first vergence or rotation for viewing the object of interest.

In some examples, to determine the position of the object of interest, second one or more images of a second user who conducts an immersive telepresence with the first user are received. Then, an interpupillary position of the second user is derived from the second one or more images. The second one or more images are displayed with the interpupillary position being set at a screen plane of a display screen for the first user. The interpupillary position at the screen plane of the display screen is determined as the position of the object of interest for the first user.

In some examples, second one or more images of a second user who conducts an immersive telepresence with the first user are received. The second one or more images are displayed on a display screen for the first user. Then, a position on the display screen for displaying an eye of the second user is determined as the position of the object of interest for the first user.

In some examples, a center point of a display screen is determined as the position of object of interest for the first user.

To detect the first vergence of the eyes of the first user, in an example, the first vergence is determined based on data sensed by an eye-tracking sensor that is separate from the camera. In some examples, the first vergence is determined based on image analysis of the first one or more images of the first user.

In an example, the first vergence of the eyes of the first user is calculated solely based on a head position of the first user.

In some examples, to calculate the mismatch of the first vergence for viewing the object of interest further, a gazing point is determined according to the first vergence of the eyes of the first user and a head position of the first user. Then, a difference of the gazing point to the position of the object of interest for the first user is calculated to determine the mismatch.

In some examples, various parameters, such as the positions of the head and/or body of the first user, the pose of the head and/or the body of the first user, the rotation angles of the head and/or of the first user can be adjusted to perform the gaze correction. In an example, a head position of the first user in the first one or more images is modified. In another example, a body position of the first user in the first one or more images is modified. In another example, a head pose of the first user in the first one or more images is modified. In another example, a body pose of the first user in the first one or more images is modified. In another example, a head rotation angle of the first user in the first one or more images is modified. In another example, a body rotation angle of the first user in the first one or more images is modified.

In some examples, the position of the object of interest is determined according to at least one of a facial expression of a person on a display screen, visual sentimental analysis of the person on the display screen, or a mood of the person on the display screen.

In some examples, the first vergence of the eyes of the first user is detected by using at least one of an inertial measurement unit (IMU), a depth sensor, a light detection and ranging (LiDar) sensor, a near infrared (NIR) sensor, or a spatial audio detector.

Then, the process proceeds to (S399) and terminates.

The process (300) can be suitably adapted. Step(s) in the process (300) can be modified and/or omitted. Additional step(s) can be added. Any suitable order of implementation can be used.

The techniques described above, can be implemented as computer software using computer-readable instructions and physically stored in one or more computer-readable media, such as non-transitory computer readable storage. For example, FIG. 4 shows a computer system (400) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 4:
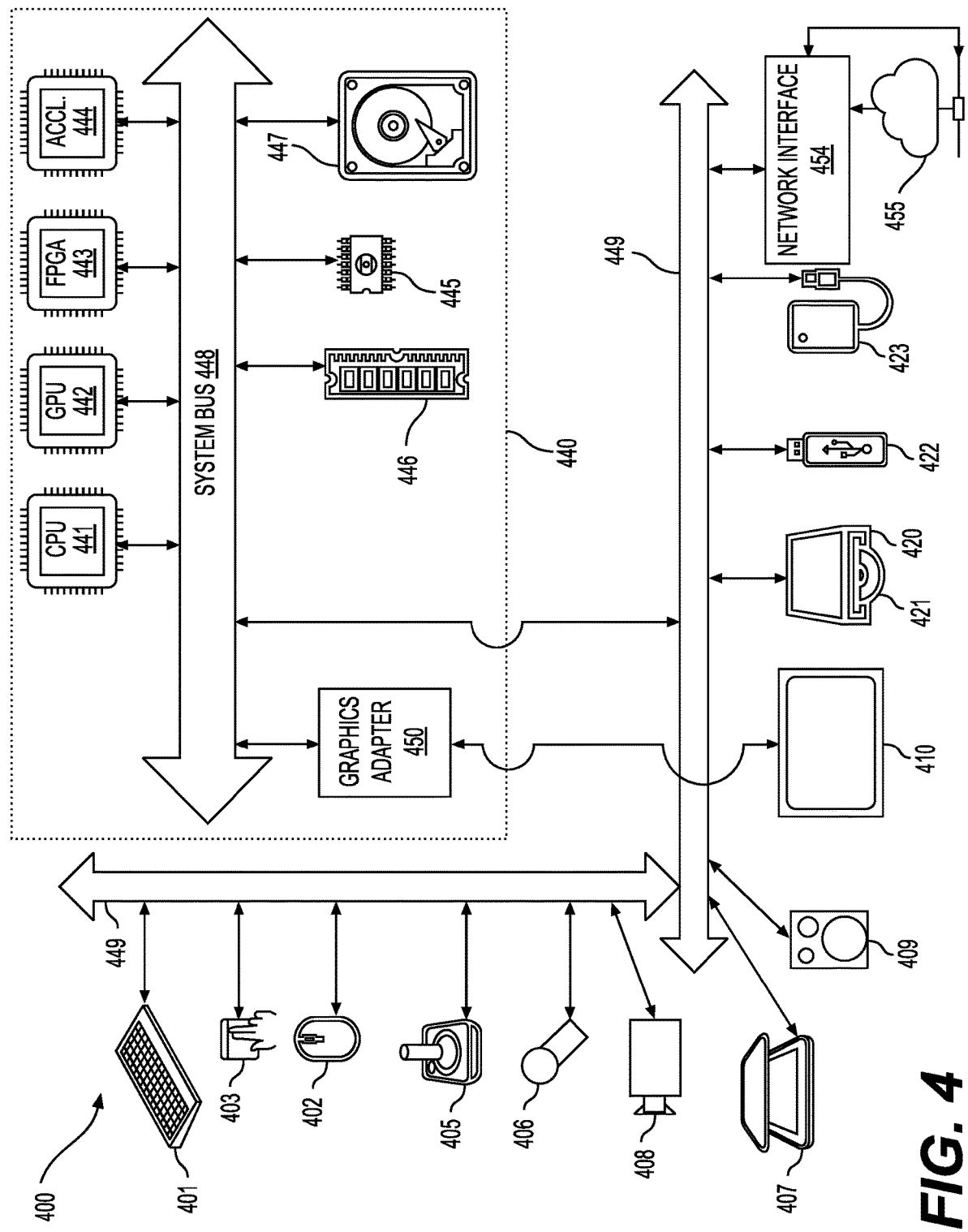
FIG. 4 is a schematic illustration of a computer system in accordance with an embodiment.

The components shown in FIG. 4 for computer system (400) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (400).

Computer system (400) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (401), mouse (402), trackpad (403), touch screen (410), data-glove (not shown), joystick (405), microphone (406), scanner (407), camera (408).

Computer system (400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (410), data-glove (not shown), or joystick (405), but there can also be tactile feedback devices that do not serve as input devices), audio output devices (such as: speakers (409), headphones (not depicted)), visual output devices (such as screens (410) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual or augmented-reality glasses (not depicted), Multiview displays, holographic displays and smoke tanks (not depicted)), and printers (not depicted).

Computer system (400) can also include human accessible storage devices and their associated media such as optical media including CD/DVD ROM/RW (420) with CD/DVD or the like media (421), thumb-drive (422), removable hard drive or solid state drive (423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (400) can also include an interface (454) to one or more communication networks (455). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (449) (such as, for example USB ports of the computer system (400)); others are commonly integrated into the core of the computer system (400) by attachment to a system bus as described below (for example Ethernet interface into a PC computer system or cellular network interface into a smartphone computer system). Using any of these networks, computer system (400) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (440) of the computer system (400).

The core (440) can include one or more Central Processing Units (CPU) (441), Graphics Processing Units (GPU) (442), specialized programmable processing units in the form of Field Programmable Gate Areas (FPGA) (443), hardware accelerators for certain tasks (444), graphics adapters (450), and so forth. These devices, along with Read-only memory (ROM) (445), Random-access memory (446), internal mass storage such as internal non-user accessible hard drives, SSDs, and the like (447), may be connected through a system bus (448). In some computer systems, the system bus (448) can be accessible in the form of one or more physical plugs to enable extensions by additional CPUs, GPU, and the like. The peripheral devices can be attached either directly to the core's system bus (448), or through a peripheral bus (449). In an example, the screen (410) can be connected to the graphics adapter (450). Architectures for a peripheral bus include PCI, USB, and the like.

CPUs (441), GPUs (442), FPGAs (443), and accelerators (444) can execute certain instructions that, in combination, can make up the aforementioned computer code. That computer code can be stored in ROM (445) or RAM (446). Transitional data can be also be stored in RAM (446), whereas permanent data can be stored for example, in the internal mass storage (447). Fast storage and retrieve to any of the memory devices can be enabled through the use of cache memory, that can be closely associated with one or more CPU (441), GPU (442), mass storage (447), ROM (445), RAM (446), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (400), and specifically the core (440) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (440) that are of non-transitory nature, such as core-internal mass storage (447) or ROM (445). The software implementing various embodiments of the present disclosure can be stored in such devices and executed by core (440). A computer-readable medium can include one or more memory devices or chips, according to particular needs. The software can cause the core (440) and specifically the processors therein (including CPU, GPU, FPGA, and the like) to execute particular processes or particular parts of particular processes described herein, including defining data structures stored in RAM (446) and modifying such data structures according to the processes defined by the software. In addition or as an alternative, the computer system can provide functionality as a result of logic hardwired or otherwise embodied in a circuit (for example: accelerator (444)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of gaze matching of a first user and a second user conducting an immersive telepresence, comprising:
    displaying one or more images of the second user on a display screen for the first user;
    determining a position of an object of interest on the display screen for the first user, wherein the object of interest is an eye of the one or more images of the second user;
    receiving one or more images of the first user that is taken by a camera;
    detecting a first vergence of eyes of the first user;
    calculating a mismatch of the first vergence for viewing the object of interest; and
    performing a gaze correction of the one or more images of the first user based on the mismatch of the first vergence for viewing the object of interest.

2. The method of claim 1, wherein the determining the position of the object of interest further comprises:
    deriving an interpupillary position of the second user from the second one or more images of the second user; and
    determining the interpupillary position at a screen plane of the display screen as the position of the object of interest for the first user.

3. The method of claim 1, wherein the camera position being at a periphery of the display screen.

4. The method of claim 1, wherein the detecting the first vergence of the eyes of the first user further comprises at least one of:
    sensing the first vergence based on an eye-tracking sensor that is separate from the camera; or
    detecting the first vergence based on an image analysis of the first one or more images of the first user.

5. The method of claim 1, wherein the detecting the first vergence of the eyes of the first user further comprises:
    calculating the first vergence of the eyes of the first user based on a head position of the first user.

6. The method of claim 1, wherein the calculating the mismatch of the first vergence for viewing the object of interest further comprises:
    determining a gazing point according to the first vergence of the eyes of the first user and a head position of the first user; and
    calculating the mismatch of the gazing point to the position of the object of interest for the first user.

7. The method of claim 1, wherein the performing the gaze correction further comprises at least one of:
    modifying a head position of the first user in the one or more images of the first user;
    modifying a body position of the first user in the one or more images of the first user;
    modifying a head pose of the first user in the one or more images of the first user;
    modifying a body pose of the first user in the one or more images of the first user;
    modifying a head rotation angle of the first user in the one or more images of the first user; or
    modifying a body rotation angle of the first user in the one or more images of the first user.

8. The method of claim 1, wherein the determining the position of the object of interest for the first user further comprises:
    determining the position of the object of interest according to at least one of a facial expression of a person on a display screen, visual sentimental analysis of the person on the display screen, or a mood of the person on the display screen.

9. The method of claim 1, wherein the detecting the first vergence of the eyes of the first user comprises:
    detecting the first vergence of the eyes of the first user by using at least one of an inertial measurement unit (IMU), a depth sensor, a light detection and ranging (LiDar) sensor, a near infrared (NIR) sensor, or a spatial audio detector.

10. An electronic system of gaze matching of a first user and a second user conducting an immersive telepresence, comprising processing circuitry configured to:
    display one or more images of the second user on a display screen for the first user;
    determine a position of an object of interest on the display screen for the first user, wherein the object of interest is an eye of the one or more images of the second user;
    receive one or more images of the first user that is taken by a camera;
    detect a first vergence of eyes of the first user;
    calculate a mismatch of the first vergence for viewing the object of interest; and
    perform a gaze correction of the one or more images of the first user based on the mismatch of the first vergence for viewing the object of interest.

11. The electronic system of claim 10, wherein the processing circuitry is configured to:
    derive an interpupillary position of the second user from the second one or more images of the second user; and
    determine the interpupillary position at a screen plane of the display screen as the position of the object of interest for the first user.

12. The electronic system of claim 10, wherein the camera position being at a periphery of the display screen.

13. The electronic system of claim 10, wherein the processing circuitry is configured to:
    sense the first vergence based on an eye-tracking sensor that is separate from the camera; or
    detect the first vergence based on an image analysis of the one or more images of the first user.

14. The electronic system of claim 10, wherein the processing circuitry is configured to:
    calculate the first vergence of the eyes of the first user based on a head position of the first user.

15. The electronic system of claim 10, wherein the processing circuitry is configured to:
    determine a gazing point according to the first vergence of the eyes of the first user and a head position of the first user; and
    calculate the mismatch of the gazing point to the position of the object of interest for the first user.

16. The electronic system of claim 10, wherein the processing circuitry is configured to:
    modify a head position of the first user in the one or more images of the first user;
    modify a body position of the first user in the one or more images of the first user;
    modify a head pose of the first user in the one or more images of the first user;
    modify a body pose of the first user in the one or more images of the first user;
    modify a head rotation angle of the first user in the one or more images of the first user; or
    modify a body rotation angle of the first user in the one or more images of the first user.

17. The electronic system of claim 10, wherein the processing circuitry is configured to:
    determine the position of the object of interest according to at least one of a facial expression of a person on a display screen, visual sentimental analysis of the person on the display screen, or a mood of the person on the display screen.

18. The electronic system of claim 10, wherein the processing circuitry is configured to:
    detect the first vergence of the eyes of the first user by using at least one of an inertial measurement unit (IMU), a depth sensor, a light detection and ranging (LiDar) sensor, a near infrared (NIR) sensor, or a spatial audio detector.

19. A non-transitory computer-readable storage medium of gaze matching of a first user and a second user conducting an immersive telepresence, storing instructions which when executed by a processor cause the processor to perform:
    displaying one or more images of the second user on a display screen for the first user;
    determining a position of an object of interest on the display screen for the first user, wherein the object of interest is an eye of the one or more images of the second user;
    receiving one or more images of the first user that is taken by a camera;
    detecting a first vergence of eyes of the first user;
    calculating a mismatch of the first vergence for viewing the object of interest; and
    performing a gaze correction of the one or more images of the first user based on the mismatch of the first vergence for viewing the object of interest.

20. The non-transitory computer-readable storage medium according to claim 19, wherein the instructions further cause the processor to perform:
    deriving an interpupillary position of the second user from the one or more images of the second user; and
    determining the interpupillary position at a screen plane of the display screen as the position of the object of interest for the first user.

* * * * *